ELECTRO-OPTICAL SWITCHING DEVICES

Filed June 5, 1959

SERGEI M. FOMENKO
INVENTOR.
BY [signatures]
ATTORNEYS

United States Patent Office 3,086,119

Patented Apr. 16, 1963

3,086,119

ELECTRO-OPTICAL SWITCHING DEVICES

Sergei M. Fomenko, Woodland Hills, Calif., assignor to Thompson Ramo Wooldridge Inc., Los Angeles, Calif., a corporation of Ohio Filed June 5, 1959, Ser. No. 818,360
3 Claims. (Cl. 250—213)

Figure 1:
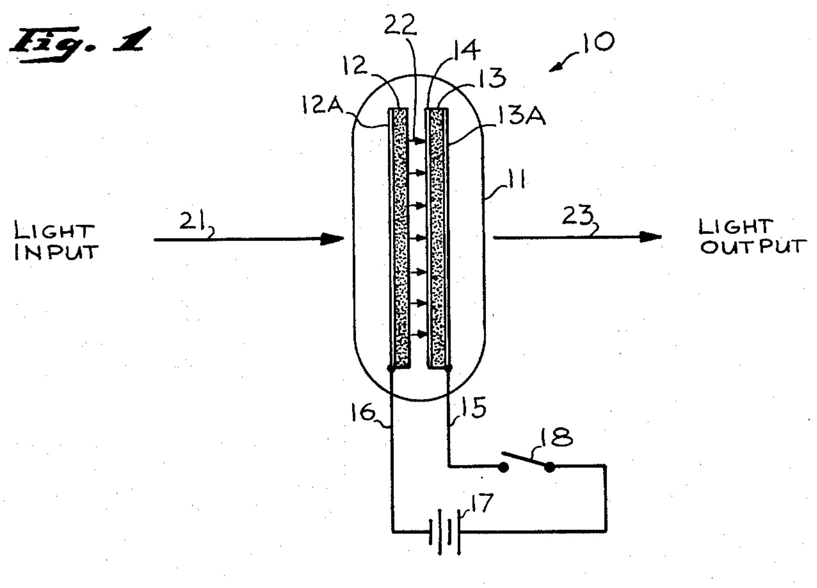

This invention relates to electro-optical devices and more particularly to a new and improved electro-optical switching device and to circuits embodying such a device.

It is well known that digital computers function in accordance with basic logical operations. In the transfer of information from one point to another within an electronic digital computer, logical operations may be performed by switching discrete electrical signals representing the information in a predetermined manner to storage devices contained within the computer. As presently constructed, the switches and the storage devices may comprise electron tubes, transistors or magnetic cores. Such devices require a relatively complex system of electrical interconnections to transfer information in the desired manner. In addition, circuit elements such as electron tubes demand a relatively large amount of power and require complex electrical connections between the individual circuit elements of each switching or storage device.

In view of the above problems, there has been some consideration given in the prior art to the application of other techniques to digital computers. One such technique is to employ electro-optical components in place of the electron tubes, transistors, and magnetic cores to accomplish the switching, logical operations, and information storage within a computer. One of the problems in a computer based upon electro-optical techniques is that of properly switching information in the form of light signals within the computer.

Accordingly, it is an object of the present invention to provide a device for switching information in the form of light signals.

It is another object of the present invention to provide a device for accomplishing the switching of information which requires a minimum of electrical wiring.

It is another object of the present invention to provide a device which produces a light signal in response to the application of light thereto.

It is a further object of the present invention to provide a device which produces a light signal in response to the application of light thereto which may be adapted for utilization in logical switching operations within a computer.

It is a still further object of the present invention to provide circuits for utilizing electro-optical devices constructed in accordance with the present invention.

In accordance with one aspect of the invention, an electro-optical device includes a first layer of material for emitting electrons in response to light being applied thereto and a second layer of material for emitting light in response to electrons impinging thereon, and means for blocking the passage of light may be disposed between the first and second layers to prevent the light emitted by one from reaching the other. In addition, there may be included means for producing a field between the layers to accelerate the electrons emitted by the first layer into contact with the second layer.

Figure 2:
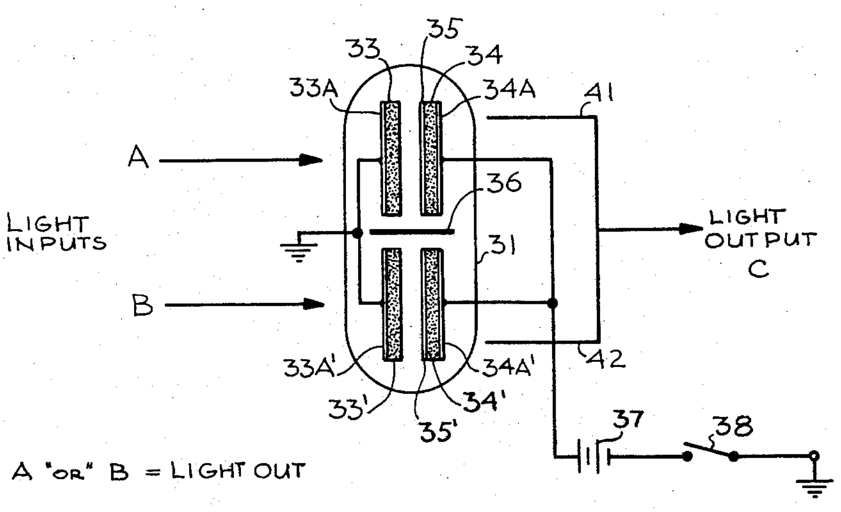

A better understanding of the invention may be had from a reading of the following detailed description, and an inspection of the drawing, in which:

FIG. 1 is a schematic representation of an electro-optical device in accordance with the present invention; and FIG. 2 is a circuit for performing a logical operation which embodies the device as illustrated in FIG. 1.

Referring to FIG. 1 of the drawing, there is disclosed an electro-optical switching element in accordance with the present invention. The electro-optical switching element or device is designated generally at 10 and includes an envelope 11 which is evacuated. A first layer 12 which emits electrons upon the application of light thereto is disposed within the envelope 11. The layer 12 may be constructed of a photo-emissive type material. Adjacent the layer of photo-emissive material 12 is a layer 13 which emits light in response to electrons impinging thereon. The layer 13 may be constructed of a material commonly referred to as cathodo-luminescent type material. Disposed between the layers 12 and 13 is a light blocking layer 14 which prevents the light emitted by the cathodo-luminescent layer 13 from contacting the photo-emissive layer 12. The light blocking layer may be constructed of any opaque material which is capable of passing electrons between the layers 12 and 13. An electric field is established between layers 12 and 13 for accelerating the electrons emitted by layer 12 toward and into contact with the layer 13.

In the presently preferred embodiment of the present invention, this field is produced by applying an electrical potential to electrodes 12A and 13A which are preferably constructed of an electrically conductive material which is transparent to the passage of light, as for example, a thin coat of silver. Thus, a source of potential 17 may be connected to the electrodes 12A and 13A by means of leads 15 and 16. The application of the potential, and thus the field between the layers 12 and 13, is controlled by a switching means 18. The switching means 18 is illustrated schematically in FIG. 1 as a simple single-pole, single-throw type switch. It will be understood, however, that the switch 18 may be replaced by any electrical or electronic circuit capable of controlling the application of an electrical potential to the electrodes 12A and 13A.

In operation, a light signal is applied from a source (not shown) to the layer of photo-emissive material 12 as illustrated by the arrow 21 which is designated as Light Input. Assuming for purposes of discussion that the switch 18 is closed, the application of a Light Input signal, which may be an information bearing signal, to the layer of photo-emissive material 12 causes the layer 12 to emit electrons. The emitted electrons are accelerated under the influence of the electric field described above from the photo-emissive layer 12 through the opaque layer 14 into contact with the cathodo-luminescent layer 13. The movement of the electrons from layer 12 to layer 13 by the field impressed therebetween is illustrated schematically in FIG. 1 by the arrows designated 22. As the electrons impinge upon the layer 13, the material of the layer is excited to emit light (or other radiant energy). Light emitted by the layer 13 in response to the impinging electrons passes from the envelope 11 as indicated by the arrow 23, which is labeled Light Output.

The Light Output signal may then be utilized to trigger an additional switch similar to that illustrated in FIG. 1 or may be used for application to a storage element or the like within a computer.

Even though a Light Input signal such as is illustrated at 21 is applied to the layer 12, no light will be emitted by layer 13 unless the field is applied between the two layers to accelerate the electrons from the layer 12 to the layer 13. Even if the field is applied between the layers, no Light Output signal 23 will be produced unless a Light Input signal is applied to the layer 12. It therefore becomes apparent that it takes the simultaneous application of a field between layers 12 and 13 and a Light Input signal impinging upon layer 12 in order to produce a Light Output signal.

By virtue of the presence of the light opaque layer 14 between the layers 12 and 13, the transmission of light through the device as well as a possible excitation of the light-emissive layer 13 by incident light or other radiation is substantially eliminated. Furthermore, the opaque layer blocks the passage of light from the light-emissive layer 13 to the electron-emitting layer 12 so as to preclude the excitation of the layer 12 by the light from the layer 13. In the absence of the opaque layer 14, feedback would occur, which under certain circumstances might cause the switching device to dwell or even to latch in its On position even after the disappearance of a Light Input signal. Accordingly, the opaque layer 14 enables the device to operate faster and more reliably in response to pulsed input signals to provide pulsed Light Output signals. Thus, the appearance of a Light Output signal occurs only where a Light Input signal is coincident in time with the application of the accelerating field.

With this in mind, it is apparent that by replacing battery 17 and switch 18 with a clock pulse signal, that is, an electrical signal which is applied to leads 15 and 16 at a predetermined time during which it is desired to transfer information within a computer, information may be transferred only when the clock pulse signal and the Light Input signal concur in time. If the Light Input signal is not applied to the layer 12 at identically the same moment that the clock pulse signal is applied to leads 15 and 16, no Light Output signal will be produced.

The layer 13 may be constructed of any phosphor type material which emits light in response to the application of electrons thereto. Examples of such phosphor type materials are zinc oxide and calcium-magnesium silicate. The layer 12 may be constructed of any material which will emit electrons in response to the application of light thereto. Examples of materials of such a nature are cesium-silver and cesium-antimony. The layer 12 may be referred to in conventional terms as a photo-cathode and the layer 13 may be referred to as a phosphor-anode.

Referring now more particularly to FIG. 2, there is illustrated a logical circuit utilizing the electro-optical switching device as illustrated in FIG. 1. The active elements of the circuit of FIG. 2 are enclosed within the evacuated envelope 31. As is illustrated, envelope 31 has disposed therein two devices similar to that of FIG. 1, each of them including a photo-emissive layer 33 and 33′, a cathodo-luminescent layer 34 and 34′ and an opaque layer 35 and 35′. An opaque partition 36 is included within the envelope 31 in order to prevent the light generated by either element 34 or 34′ from contacting the opposite photo-emissive layer of material 33′ or 33, respectively. As illustrated, light transparent electrodes 33A and 33A′ are interconnected and returned to a point of fixed potential. Light transparent electrodes 34A and 34A′ are also interconnected and returned to the source of potential 37 which is connected through a switch 38 to the point of fixed potential. Each of the elements contained within the envelope 31 operates in a manner similar to that described in conjunction with FIG. 1 above. If a source of light impinges upon the photo-cathode 33, it emits electrons which pass through the opaque layer 35 and impinge upon phosphor-anode 34, causing it to emit light. The same series of operations apply to the elements 33′, 34′ and 35′.

As is indicated in FIG. 2, two Light Input signals are provided, each from a source (not illustrated). One Light Input signal is designated as "A" while the other is designated as "B." The output signals of light coming from the phosphor-anodes 34 and 34′ are optically combined to provide a single Light Output signal.

In operation, switch 38 is closed to establish a field between each of the elements 33 and 34 and 33′ and 34′ respectively. During the time the field is applied, a Light Input signal A applied to layer 33 causes it to emit electrons which are accelerated by the field across the space through the opaque layer 35 to impinge upon layer 34. Layer 34 emits light in turn in response to the electrons impinging thereon, which travels along the optical path 41 (illustrated schematically) to provide a Light Output signal. If instead of the Light Input signal A, a Light Input signal B is applied to the layer 33′, the same sequence of operations occurs, causing the layer 34′ to emit light. The light emitted by the layer 34′ travels along the path 42 (illustrated schematically) to produce a Light Output signal. If, of course, both Light Input signals A and B are present at the same time, a Light Output signal is produced. A circuit such as that illustrated in FIG. 2 provides a logical operation which may be referred to as a logical "OR" circuit, indicating that when either light signal A or light signal B is present, a Light Output signal is provided corresponding to the logical equation:

$$C=A+B$$

where C corresponds to the Light Output signal.

A logical "AND" operation may be performed by the device as illustrated in FIG. 1. As above described, coincidence of application of the Light Input signal 21 and the closing of the switch 18 must occur to produce a Light Output signal 23. This, therefore, meets the requirements of a logical "AND" circuit. In the alternative, the switch 18 may be replaced with a photo-sensitive switch such as a photo diode. In this case the coincidence of two Light Input signals is required to produce a Light Output signal corresponding to the logical equation:

$$C=A \cdot D$$

where D equals a Light Input signal controlling the application of the field.

The switch 38 as illustrated in FIG. 2 may also be constructed in the same manner as described with respect to FIG. 1. The circuit of FIG. 2 may then be used to perform a logical "AND-OR" function for it would require the coincidence of the switch 38 closing and either Light Input signal A or B to produce a Light Output signal corresponding to the logical equation:

$$C=A \cdot D+B \cdot D$$

where D equals an input signal which closes the switch 38 to establish the electric fields in the device.

As above described the switch 38 and battery 37 may be replaced by a clock pulse source in order to apply a field across the photo-emissive and cathodo-luminescent materials at a predetermined time when it is desired to cause information to be transferred from one point to another within the computer.

Although as illustrated in FIG. 2, each of the electro-optical switching devices as illustrated within FIG. 1 is contained within a single, evacuated envelope having an opaque element disposed therebetween to keep the light emitted by one of the cathodo-luminescent layers from striking the opposite photo-emissive layer, it should be expressly understood that each of the elements may be contained within a single evacuated envelope and the opaque elements, such as illustrated at 36, may be disposed therebetween in order to accomplish the same result.

Although there has been thus disclosed an electro-optical switching device which transmits a light signal in response to the application of light thereto and which requires a minimum of electrical wiring to transmit information, along with circuits for utilizing the electro-optical switching devices, it will be appreciated that the invention is not limited thereto. Accordingly, any and all modifications, alterations, adaptations or equivalent arrangements falling within the scope of the annexed claims should be considered to be a part of the present invention.

What is claimed is:

1. An electro-optical switching device for performing a logical operation and producing an output light signal in accordance with the respective conditions of at least two separate condition representing input signals at least one of which comprises a light signal, said device comprising the combination of a layer of photoemissive material upon which said light input signal impinges and which is adapted to emit electrons in response to said light input signal, a layer of cathodo-luminescent material spaced from said layer of photoemissive material, an opaque member disposed between said photoemissive and cathodo-luminescent layers for blocking the passage of light while permitting the passage therethrough of electrons emitted by the photoemissive layer, said layers being responsive to the other of said input signals for selectively establishing an electrostatic field therebetween whereby said cathodo-luminescent layer provides a light output signal in accordance with the logical relationship $$C=A\cdot D$$

where A represents one input signal, C represents the light output signal, and D represents the other input signal.

2. An electro-optical switch for performing a logical operation and producing an output light signal in accordance with the respective conditions of at least two separate condition representing input signals each comprising a light signal, said switch comprising the combination of first and second electro-optical devices corresponding to each of said two light input signals, each of said devices including a layer of photoemissive material upon which one of said light input signals impinges and which is adapted to emit electrons in response to the impinging light input signal, each of said electro-optical devices also including a layer of cathodo-luminescent material spaced from said layer of photoemissive material and including further an opaque layer disposed between said photoemissive and cathodo-luminescent layers for blocking the passage of light while permitting the passage of electrons emitted by the photoemissive layer, a light shield disposed between said first and second electro-optical devices to prevent the passage of light therebetween, and means establishing electrostatic fields between the photoemissive and cathodo-luminescent layers in each of said electro-optical devices, said cathodo-luminescent layers being connected to provide a light output signal in accordance with the logical relationship $$C=A+B$$

where A represents one input signal, B represents the other input signal, and C represents the light output signal.

3. An electro-optical switch for performing a logical operation in accordance with the respective conditions of at least three separate condition representing input signals at least two of which comprise light signals, said switch comprising the combination of first and second electro-optical devices corresponding to said two light input signals disposed in spaced apart relationship, each of said devices including a layer of photoemissive material upon which one of said light input signals impinges and which is adapted to emit electrons in response thereto, each of said electro-optical devices also including a layer of cathodo-luminescent material spaced from said layer of photoemissive material and further including an opaque member disposed between said photoemissive and cathodo-luminescent layers for blocking the passage of light while permitting the passage of electrons emitted by the photoemissive layer, said layers being responsive to a third of said input signals for selectively establishing an electrostatic field therebetween, and said cathodo-luminescent layers being combined to provide a light output signal in accordance with the logical relationship $$C=A\cdot D+B\cdot D$$

where A represents one light input signal, B represents another light input signal, C represents the light output signal, and D represents a third input signal.

References Cited in the file of this patent

UNITED STATES PATENTS

| | | |
|---|---|---|
| 2,120,916 | Bitner | June 14, 1938 |
| 2,594,740 | Forest | Apr. 29, 1952 |
| 2,605,335 | Greenwood | July 29, 1952 |
| 2,796,532 | Teague | June 18, 1957 |

OTHER REFERENCES

Eckert: "A Survey of Digital Computer Memory Systems," Proceedings of the I.R.E., October 1953, pages 1404–05.